United States Patent
Han et al.

(10) Patent No.: US 8,983,388 B2
(45) Date of Patent: Mar. 17, 2015

(54) METHOD AND APPARATUS TO FACILITATE PREVENTING INTERFERENCE AS BETWEEN BASE STATIONS SHARING CARRIER RESOURCES

(75) Inventors: Guang Han, Arlington Heights, IL (US);
Rajeev Agrawal, Northbrook, IL (US);
Anand S. Bedekar, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1019 days.

(21) Appl. No.: 12/540,414

(22) Filed: Aug. 13, 2009

(65) Prior Publication Data
US 2010/0081388 A1   Apr. 1, 2010

Related U.S. Application Data

(60) Provisional application No. 61/101,397, filed on Sep. 30, 2008.

(51) Int. Cl.
*H04B 1/00*   (2006.01)
*H04B 15/00*   (2006.01)
(Continued)

(52) U.S. Cl.
CPC .......... *H04W 16/14* (2013.01); *H04W 72/0426* (2013.01)
USPC ...................................... 455/63.1

(58) Field of Classification Search
CPC ..... H04W 36/06; H04W 36/08; H04W 36/18; H04W 36/26; H04W 72/082; H04W 24/02; H04W 28/04; H04W 28/16; H04W 28/26; H04W 36/0016; H04W 72/042; H04W 72/0453
USPC ........ 455/67.11, 63.1, 501, 59, 62, 63.3, 443, 455/450, 509; 370/329, 431
See application file for complete search history.

(56) References Cited

U.S. PATENT DOCUMENTS 5,497,503 A  * 3/1996 Rydberg et al. ............... 455/454
5,732,073 A    3/1998 Kusaki et al.
(Continued)

FOREIGN PATENT DOCUMENTS

EP   1248479 A2   10/2002
EP   1843618 A2   10/2007
(Continued)

OTHER PUBLICATIONS

3GPP TSG-RAN WG4 Meeting #44, "Spectrum Arrangement to enable Co-channel deployment of Home NodeBs", athens, Greece, Aug. 20-24, 2007, R4-0701494, all pages.
(Continued)

*Primary Examiner* — Yuwen Pan
*Assistant Examiner* — Ayodeji Ayotunde
(74) *Attorney, Agent, or Firm* — Faegre Baker Daniels LLP

(57) ABSTRACT

A first base station communicates (102) with a second base station (wherein an ongoing communication cannot be handed over from the first base station to the second base station and wherein the first and second base station each employ, at least in part, a same set of carrier resources) to prevent interference by usage of the second base station with a user of the first base station. By one approach, this activity can be based, at least in part, upon receipt (101) of a message from an end user platform indicating that a carrier resource that is presently being used by the end user platform is being interfered with by the second base station. By another approach, this activity can take place prior to any actual such interference.

8 Claims, 2 Drawing Sheets

(51) Int. Cl.
*H04W 16/14* (2009.01)
*H04W 72/04* (2009.01)

(56) References Cited

U.S. PATENT DOCUMENTS

| | | | |
|---|---|---|---|
| 6,400,704 B2 | 6/2002 | Mikuni et al. | |
| 6,553,231 B1 * | 4/2003 | Karlsson et al. | 455/436 |
| 6,744,740 B2 | 6/2004 | Chen | |
| 6,771,968 B1 | 8/2004 | Heubel | |
| 7,107,012 B2 * | 9/2006 | Kashiwagi et al. | 455/63.4 |
| 7,352,690 B2 | 4/2008 | Geile et al. | |
| 7,352,779 B2 | 4/2008 | Geile et al. | |
| 7,355,963 B2 | 4/2008 | Geile et al. | |
| 7,355,964 B2 | 4/2008 | Geile et al. | |
| 7,366,128 B2 * | 4/2008 | Hundal et al. | 370/328 |
| 7,391,712 B2 | 6/2008 | Geile et al. | |
| 7,391,753 B2 | 6/2008 | Tiedemann, Jr. et al. | |
| 7,392,015 B1 | 6/2008 | Farlow et al. | |
| 7,392,018 B1 | 6/2008 | Ebert et al. | |
| 7,558,577 B2 | 7/2009 | Dillon et al. | |
| 7,917,149 B2 | 3/2011 | Chen et al. | |
| 8,027,393 B2 * | 9/2011 | Hui et al. | 375/260 |
| 2001/0016499 A1 * | 8/2001 | Hamabe | 455/454 |
| 2001/0027103 A1 * | 10/2001 | Willingham et al. | 455/436 |
| 2003/0117966 A1 | 6/2003 | Chen | |
| 2004/0092281 A1 * | 5/2004 | Burchfiel | 455/522 |
| 2004/0125768 A1 | 7/2004 | Yoon | |
| 2004/0192325 A1 | 9/2004 | Backes et al. | |
| 2004/0203828 A1 * | 10/2004 | Mirchandani et al. | 455/452.1 |
| 2005/0032537 A1 * | 2/2005 | Miyashita | 455/517 |
| 2005/0130662 A1 | 6/2005 | Murai | |
| 2005/0249322 A1 * | 11/2005 | Gerlach | 375/355 |
| 2006/0262750 A1 | 11/2006 | Walton et al. | |
| 2007/0004423 A1 * | 1/2007 | Gerlach et al. | 455/452.2 |
| 2007/0081449 A1 | 4/2007 | Khan | |
| 2007/0087740 A1 | 4/2007 | Petersen | |
| 2007/0147287 A1 | 6/2007 | Jalil et al. | |
| 2007/0207737 A1 * | 9/2007 | Hui et al. | 455/63.1 |
| 2007/0223419 A1 | 9/2007 | Ji et al. | |
| 2007/0287464 A1 | 12/2007 | Hamamoto et al. | |
| 2008/0081626 A1 | 4/2008 | Choi et al. | |
| 2008/0311942 A1 | 12/2008 | Kim et al. | |
| 2009/0040972 A1 | 2/2009 | Robson et al. | |
| 2009/0197588 A1 * | 8/2009 | Khandekar et al. | 455/422.1 |
| 2009/0268684 A1 * | 10/2009 | Lott et al. | 370/329 |

FOREIGN PATENT DOCUMENTS

| | | |
|---|---|---|
| JP | 07-162948 A | 6/1995 |
| KR | 20080089516 A | 10/2008 |
| WO | 02091597 A2 | 11/2002 |
| WO | WO 2005/015917 A2 | 2/2005 |
| WO | WO 2007/050018 A1 | 5/2007 |
| WO | WO 2007/126351 A1 | 11/2007 |
| WO | 2008088253 A1 | 7/2008 |
| WO | WO2008155732 A2 | 12/2008 |

OTHER PUBLICATIONS

3GPP TS 36.300, v8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), all pages.
3GPP TR 25.820 v8.2.0 (Sep. 2008), 3rd Generation Partnership Project; Technical Specification Group Radio Access Networks; 3G Home NodeB Study Item Technical Report (Release 8), all pages.
3GPP TS 36.304, v8.4.0 (Dec. 2008), 3rd Generation Partnership Project; Technical Specification Group Radio Access Network; Evolved Universal Terrestrial Radio Access (E-UTRA); User Equipment (UE) procedures in idle mode (Release 8), all pages.
3GPP TSG-RAN Working Group 4 (Radio) meeting #46, R4-080409, Sorrento, Italy, Feb. 11-15, 2008, all pages.
Kang, Gab-Yeon: "The International Search Report and the Written Opinion of the International Searching Authority", Korean Intellectual Property Office, Daejeon, Republic of Korea, completed: Mar. 23, 2010, mailed: Mar. 26, 2010, all pages.
United States Patent and Trademark Office, "Notice of Allowance and Fee(s) Due" for U.S. Appl. No. 12/692,834 dated Jan. 23, 2012, 19 pages.
United States Patent and Trademark Office, "Non-Final Rejection" for U.S. Appl. No. 12/261,483 dated Aug. 4, 2011, 11 pages.
Korean Intellectual Property Office, "Notice of Preliminary Rejection" for Korean Patent Application No. 10-2011-7012186 dated Apr. 29, 2013, 3 pages English Translation.
3GPP TSG-RAN WG4 Meeting #44, "Spectrum Arrangement to enable Co-channel deployment of Home NodeBs", Nortel, Athens, Greece, Aug. 20-24, 2007.
International Search Report and Written Opinion issued in PCT/US2009/054859, mailed Mar. 26, 2010, 7 pages.
International Search Report and Written Opinion issued in PCT/US2009/059488, mailed May 18, 2010, 7 pages.
International Search Report and Written Opinion issued in PCT/US2010/026173, mailed Jun. 2, 2010, 10 pages.
Supplemental European Search Report issued in EP Application No. 09840569, mailed May 8, 2014, 10 pages.
The State Intellectual Property Office of the People's Republic of China, Notification of the First Office Action, Jun. 25, 2013.

* cited by examiner

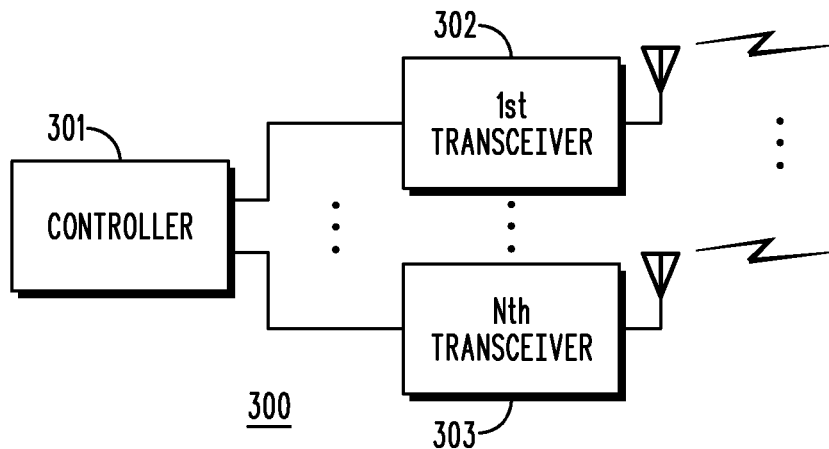
FIG. 3
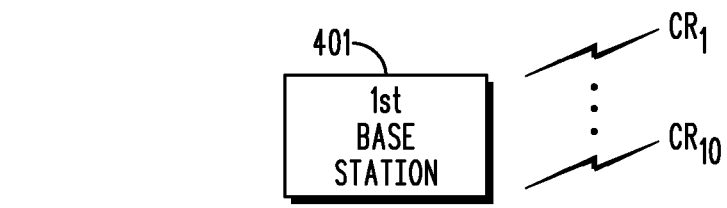
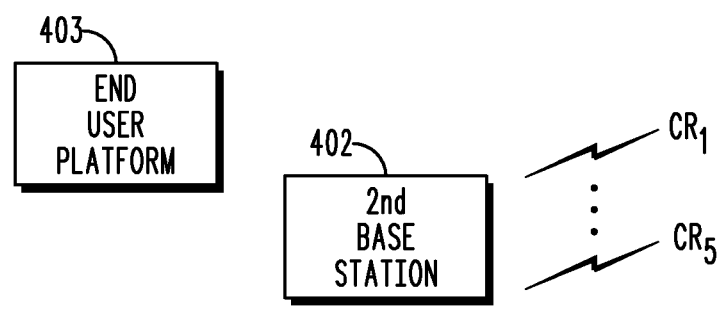
FIG. 4
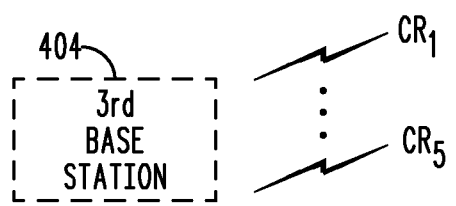

METHOD AND APPARATUS TO FACILITATE PREVENTING INTERFERENCE AS BETWEEN BASE STATIONS SHARING CARRIER RESOURCES

TECHNICAL FIELD

This invention relates generally to wireless communications and more particularly to application settings where two base stations share carrier resources but where an ongoing communication cannot be handed over from one of the base stations to the second due, at least in part, to administrative differences, admission control, and/or load conditions.

BACKGROUND

Wireless communications systems of various kinds are known in the art. These include systems where base stations support the temporary allocation of carrier resources on an as-needed basis to end user platforms. In some cases, as with many cellular telephony systems, an on-going communication can be handed over from one base station to another. In other application settings, such a handover is not available due, at least in part, to administrative differences. (As used herein, the expression "administrative differences" will be understood to refer to differences that are based upon operational agreements that pertain to allowed functionality.)

As an example of the latter, some application settings contemplate employing both wide-area base stations and small-area base stations (where the small-area base stations might serve, for example, a home residence or a local office setting while the wide-area base stations might serve an entire neighborhood or the like). Both types of base station use, at least to some extent, the same pool of carrier resources. A basic operating presumption is that an end user platform that is associated with a given small-area base station will use the latter's resources when possible. As a previously arranged administrative relationship must exist between the end user platform and the small-area base station, handovers between the wide-area base stations on the one hand and the small-area base stations on the other hand are unsupported.

Generally speaking, the use of the shared carrier resources by the small-area base stations is to be respectful of and subservient to the use of such resources by the wide-area base stations. As one approach in this regard, the prior art proposes to simply permanently segregate the carrier resources that are used by each type of base station. In many cases, however, this leads to technical, legal, and/or efficiency and loading concerns. Other proposed solutions are potentially useful in a limited application setting where, for example, there is only one small-area base station in operation. As additional small-area base stations come into play, however, existing resource allocation schemes yield less than satisfactory results. Yet other proposed solutions impose a considerable burden on the end user platform to support the interference-avoidance functionality.

BRIEF DESCRIPTION OF THE DRAWINGS

The above needs are at least partially met through provision of the method and apparatus to facilitate preventing interference as between base stations sharing carrier resources described in the following detailed description, particularly when studied in conjunction with the drawings, wherein:

FIG. 3 comprises a block diagram as configured in accordance with various embodiments of the invention; and FIG. 4 comprises a block diagram as configured in accordance with various embodiments of the invention.

Figure 1:
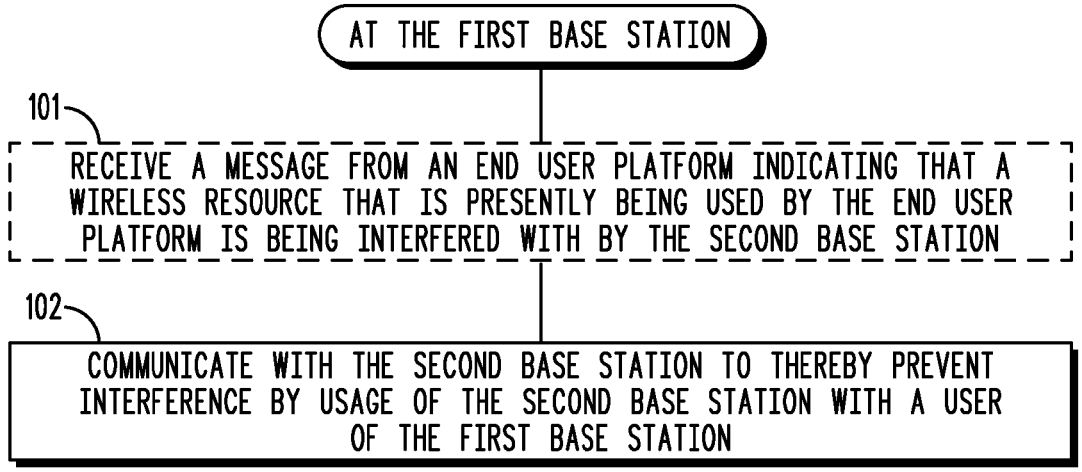
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments are for use in preventing interference as between a first base station and a second base station, wherein an ongoing communication cannot be handed over from the first base station to the second base station and wherein the first and second base station each employ, at least in part, a same set of carrier resources. Pursuant to these teachings, the first base station can support this purpose by communicating with the second base station to thereby prevent such interference by usage of the second base station with a user of the first base station. By one approach, this activity can be based, at least in part, upon receipt of a message from an end user platform indicating that a carrier resource that is presently being used by the end user platform is being interfered with by the second base station. By another approach, this activity can take place prior to any such actual interference.

By one approach, this communication between the first and second base stations can comprise, at least in part, informing the second base station of at least one identified carrier resource that is not to be used by the second base station. By another approach, this communicating can comprise, at least in part, informing the second base station of at least one identified carrier resource that is to be used by the second base station.

If desired, and by one approach, the aforementioned activity can occur responsive to receiving a message from an end user platform indicating that a carrier resource that is presently being used by the end user platform is being interfered with by the second base station. These teachings will also accommodate taking the described action in response to information received from the second base station regarding carrier resource assignments and/or restrictions or instructions that the second base station has received from other base stations. Also if desired, the aforementioned communication between the first and second base station can occur via a direct or an indirect communication link. As yet another possibility in this regard, these teachings will also accommodate having the second base station block taking the described action with respect to a given carrier resource when and if it detects uplink interference that exceeds some predetermined threshold.

So configured, those skilled in the art will appreciate that such approaches will readily support the sharing of carrier resources as between disparate systems (i.e., systems that will not accept handovers of ongoing communications between themselves) in a manner that is economically inclined and that will well support a robust and efficient allocation of such resources in support of varied end users that rely upon such systems. It will be further appreciated that these teachings are readily implementable by leveraging numerous existing platform architectures and protocols. These teachings are also highly scalable and will accommodate a wide range of system variables, carrier resources, base stations, and so forth.

These and other benefits may become clearer upon making a thorough review and study of the following detailed description. Referring now to the drawings, and in particular to FIG. 1, an illustrative process (100) that is compatible with many of these teachings will now be presented. It will be understood that this process 100 can be used to prevent interference as between a first base station and a second base station, wherein an ongoing communication cannot be handed over from the first base station to the second base station and wherein the first and second base station each employ, at least in part, a same set of carrier resources. (As used herein, the expression "carrier resources" will be understood to include carrier frequencies and/or the modulation and/or signaling technologies that are employed when physically employing such carrier frequencies.)

The process 100 illustrated in FIG. 1 can be carried out by a corresponding first base station. For the sake of illustration and not by way of limitation, this first base station will be presumed to comprise a wide-area base station as comprises a part of a wide-area wireless communications system. This can include, for example, a system employing a single high power base station that provides coverage over many miles. This can also include, however, a system employing many base stations (which perhaps may vary with respect to their transmission power from one another) that collectively provide coverage over many miles and where a handover of an ongoing communication between such base stations is readily accommodated.

As shown, this process 100 will accommodate an optional step 101 of receiving a message from an end user platform indicating that a carrier resource that is presently being used by the end user platform (in conjunction with the first base station) is being interfered with by the second base station. As already noted above, under the given application circumstances, it is not possible to handover the present ongoing communication of this end user platform from the first base station to the second base station. This message can be communicated to the first base station using, for example, a protected and dedicated signaling channel that is not itself likely to be interfered with by the second base station. Those skilled in the art will recognize that other means and methods of communicating such a message to the first base station are likely available. As these teachings are not overly sensitive to any particular selection in this regard, for the sake of brevity and the preservation of clarity, further elaboration in this regard will not be presented here.

Regardless of whether the process 100 as implemented includes the aforementioned step 101, the process 101 then provides the step 102 of communicating with the second base station to thereby prevent interference by usage of the second base station with a user of the first base station. This communication can be facilitated using whatever communication resource may be available in a given application setting. For example, this step 102 can include using a direct communication link (including a wired and/or a wireless link) as exists between the first and second base station. As another example, this step 102 can include using an indirect communication link as between these base stations. This might include, for example, the use of an intervening communications network (or networks) by which the indicated communication is essentially relayed from the first base station to the second base station. As one non-limiting, illustrative example of an indirect communication, an end user platform of the first base station could send the instruction using Random Access Channel (RACH) as is known in the art to the second base station. As another example in these regards, the first base station could send the instruction to a network gateway, and the network gateway could then forward the instruction to the second base station.

The precise nature of this communication can also vary with respect to the application setting and/or the needs or requirements of the system designer or administrator. By one approach, for example, this communication can comprise a message that identifies (directly or indirectly) at least one identified carrier resource that is not to be used by the second base station. In such a case, and where there are a total of five resources available to the second base station, the second base station would know to avoid using the specifically identified resource while no such limitation would apply to the remaining four resources.

As another example in this regard, this communication could comprise a message that identifies (directly or indirectly) at least one carrier resource that is to be used by the second base station. In this case, the second base station would then know to use the identified resources and to avoid using the non-identified resources. It would also be possible, of course, to combine these two approaches. In this case, the communication would identify both the resources to be avoided and the resources to be used by the second base station.

As noted earlier, this process 100 will accommodate receiving an indication from an end user platform that the end user platform is experiencing interference from the second base station. In such a case, the described step 102 of communicating with the second base station will typically occur subsequent to actual interference between the first base station and the second base station. It would be possible, of course, for this communication step to occur subsequent to actual interference based upon other triggering criteria as well if desired.

This process 100 will also accommodate, however, effecting this step 102 of communicating with the second base station prior to any actual interference between the first base station and the second base station. Such an approach might be based, for example, upon the day of the week and/or the time of the day. Such an approach might also be based upon other kinds of sensor input (such as location information as corresponds to end user platforms that are presently using the carrier resources of the first base station). Other possibilities in these regards could be similarly accommodated as well.

As noted, these teachings will accommodate providing a message to the second base station that comprises an instruction regarding usage of at least one of the carrier resources. By one approach, the substance of this instruction can remain effective unless and until the first base station releases the second base station from the constraints of the instruction and/or replaces that instruction with a subsequent instruction. By another approach, if desired, these teachings will accommodate automatically releasing the second base station from the instruction in response to some predetermined criterion or metric. For example, the second base station can be released from the instruction when at least a predetermined amount of time (such as, for example, fifteen seconds, one minute, five minutes, or the like) passes without any reported interference from the second base station.

By one approach, this step 102 of communicating with a second base station can comprise a communication carrying instructions that are unique to this particular second base station. Such might be the case, for example, when the first base station is responding to a report of an actual present instance of interference that is owing to the second base station. If desired, however, this step can comprise communicating an instruction that is shared with a plurality of base stations including this particular second base station. Such might be the case, for example, when the first base station is essentially protecting and guarding a given carrier resource by instructing a plurality of second base stations to avoid using that particular given carrier.

These teachings will also accommodate having the first base station elect particular carrier resources to protect as a function, at least in part, of information received from the second base station itself. Such information can be received prior to, or subsequent to, the first base station providing an instruction to the second base station regarding the usage of particular carrier resources. For example, by one approach, the second base station, upon receiving an instruction to avoid using a particular carrier resource, might respond to the first base station by providing an indication that it is already being instructed to avoid (by other first base stations, for example) using its four other available carrier resources. In such a case, complying with the first base station's instructions will deny the second base station any usable carrier resources whatsoever. In such a case, the first base station may provide a subsequent alternative instruction to the second base station that alters the previous instruction.

These teachings will readily accommodate other negotiation approaches as well. For example, the second base station, upon receiving an instruction from the first base station, can check if its available carrier resources would be larger than a given threshold if the instruction were followed. When not true, the second base station can be permitted to not accept the instruction. Using this approach, for example, a second base station administrator who pays a higher subscription fee could have a larger threshold in this regard to ensure its available bandwidth.

As another example in these regards, the carrier resources that the first base station can instruct the second base station to avoid could be upper bounded. Base stations of different types (varying, for example, with respect to size, subscription rate, and so forth) could have, for example, differing upper bounds. By this approach, the second base station could be configured, for example, to determine whether the aforementioned message as is received from the first base station has instructional content that conflicts with a protected status that the second base station is administratively permitted to accord to some, but not all, of its carrier resources. These negotiation approaches could be leveraged to mitigate or to at least manage interference amongst a cluster of densely deployed base stations.

Figure 2:
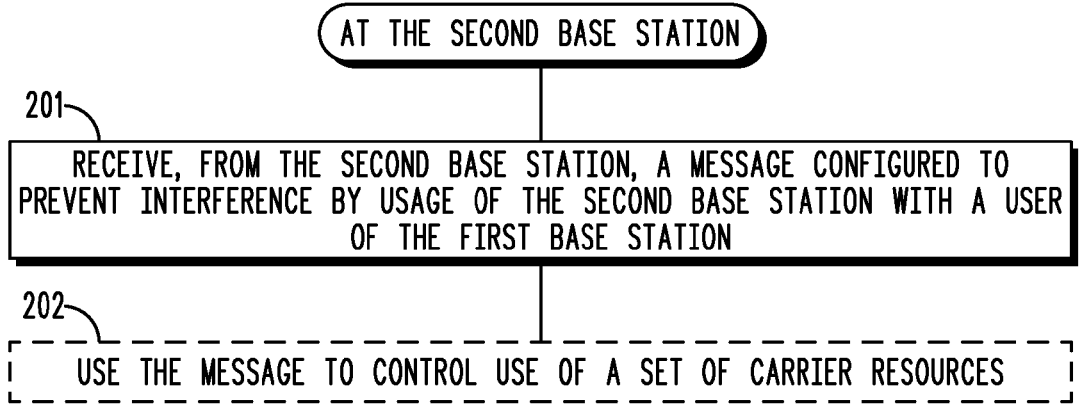
FIG. 2 comprises a flow diagram as configured in accordance with various embodiments of the invention.

The process 100 described above would typically be carried out by a first base station (as characterized above). Referring now to FIG. 2, a corresponding process 200 to be carried out by a corresponding second base station will now be described. This process 200 generally provides for the step 201 of receiving, from the first base station, a message configured to prevent interference by usage of the second base station with a user of the first base station. As disclosed above, this message can serve to identify at least one carrier resource that is not to be used by the second base station, and/or that is to be used by the second base station. Also as disclosed above, this message can be delivered as desired via a direct communication link and/or an indirect communication link.

Such a process 200 can then readily accommodate the step 202 of using this message to control the use of the second base station's set of carrier resources. This can comprise, for example, adhering to the instructions as may have been provided by the first base station with respect to the use, or non-use, of specific carrier resources.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example, a first base station 300 can comprise a controller 301 that operably couples to a plurality of transceivers 1 through N (where "N" will be understood to comprise an integer greater than 1) as denoted by reference numerals 302 through 303. These transceivers are configured to employ carrier resources in support of wireless communications for wireless end users of the first base station.

Those skilled in the art will recognize and appreciate that the controller 301 can comprise a fixed-purpose hard-wired platform or can comprise a partially or wholly programmable platform. All of these architectural options are well known and understood in the art and require no further description here. This controller 301 can be configured (via, for example, corresponding programming as will be well understood by those skilled in the art) to carry out one or more of the steps, actions, and/or functionality as described herein. This can include, for example, communicating with the second base station to thereby prevent interference by usage of the second base station with a user of the base station.

Those skilled in the art will recognize and understand that such an apparatus 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize that such a platform will also serve to support the described functionality of the second base station as well, if desired.

Referring now to FIG. 4, an illustrative application setting might comprise, for example, a first base station 401 that comprises part of a wide-area communications service (such as a cellular telephony-styled service) and a second base station 402 that comprises a so-called femtocell that only provides communications services to a small corresponding group of registered users. The first base station 401 might provide services, for example, over an area of some miles that includes numerous buildings while the second base station 402 might provide services only over a radius of about 100 meters with an intended service area comprising a residential building and its surrounding environs. In this example, the first base station 401 makes use of a set of carrier resources $CR_1$ through $CR_{10}$. The second base station 402 makes use of a corresponding subset comprising $CR_1$ through $CR_5$.

In this example, an end user platform 403 is carrying on communications using carrier resource $CR_1$ via the first base station 401. Upon nearing the second base station 402 during the course of this ongoing communication, however, the second base station's use of carrier resource $CR_1$ begins to interfere with the end user platform's use of that same carrier resource via the first base station 401. Sensing this interference, the end user platform 403 transmits a message to the first base station 401 to report this circumstance. In this particular example, this message might comprise a Channel Quality Information (CQI) report as is known in the art.

The first base station 401 receives the aforementioned message from the end user platform 403. The first base station 401 may also receive similar reports from other end user platforms (not shown). Based upon this input, the first base station 401 can then select a most appropriate resource (presumed in this example to be $CR_1$) to be used by the interfered-with end user platform 403 (which may, or may not, comprise a present channel resource that is being used thereby) and, in accord with these teachings, then contact the second base station 402 and instruct the latter to cease using carrier resource $CR_1$. In response, the second base station 402 promptly terminates its usage of that carrier resource (likely switching its present usage to another of its carrier resources that remains available for usage). This, in turn, removes the source of interference and the end user platform's present communication can continue without further disturbance due to this source.

By one approach, as when the application setting optionally includes another base station such as the third base station 404 shown in FIG. 4 (which also comprises another small range base station akin to the second base station 402 described earlier), the first base station 401 can also instruct this third base station 404 to also avoid use of carrier resource $CR_1$ at this time in order to ensure that the end user platform will continue without interference should the latter move in the direction of the third base station 404.

So configured, those skilled in the art will appreciate that these teachings offer a reliable, efficient, and generally equitable approach to ensuring that the users of a wide-area communications system receive a robust service environment while also permitting secondary small-area communications systems to share the same resources as the wide-area communications system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in this regard, it will be understood that these teachings are applicable to protecting both the downlink and uplink communications of an end user platform. As another example in this regard, it will be similarly understood that these teachings are readily applicable to protecting voice communications, user data-bearing communications, system control signaling communications, and so forth.

We claim:

1. A method for use in preventing interference as between a first base station and a second base station, wherein an ongoing communication cannot be handed over from the first base station to the second base station and wherein the first and second base station each employ, at least in part, a same set of carrier resources, the method comprising:
   at the first base station:
   prior to any actual interference between the first base station and the second base station, communicating to the second base station at least one identified carrier resource that is not to be used by the second base station to thereby prevent interference by usage of the second base station with a user of the at least one identified carrier resource of the first base station in the ongoing communication; and
   releasing the second base station from not using the at least one identified carrier resource when at least a predetermined amount of time passes without any reported interference from the second base station.

2. The method of claim 1 wherein the communicating comprises effecting the communication via at least one of:
   a direct communication link between the first base station and the second base station;
   an indirect communication link between the first base station and the second base station.

3. The method of claim 1 wherein the communicating comprises, at least in part:
   receiving from the second base station information regarding carrier resource assignments that the second base station has received from yet other base stations;
   using this information regarding carrier resource assignments when providing instructions to the second base station regarding carrier resources to avoid the interference.

4. A base station comprising:
   a plurality of transceivers configured to employ carrier resources in support of wireless communications for wireless end users;
   a controller operably coupled to the plurality of transceivers and configured to prevent interference as between the base station and a second base station by, prior to any actual interference between the first base station and the second base station, communicating to the second base station at least one identified carrier resource that is not to be used by the second base station to thereby prevent interference by usage of the second base station with a user of the at least one identified carrier resource of the base station in the ongoing communication and to release the second base station from not using the at least one identified carrier resource when at least a predetermined amount of time passes without any reported interference from the second base station;
   wherein an ongoing communication cannot be handed over from the first base station to the second base station and wherein the base station and the second base station each employ, at least in part, a same set of carrier resources.

5. The base station of claim 4 wherein the controller is configured to effect the communicating via at least one of:
   a direct communication link between the base station and the second base station;
   an indirect communication link between the first base station and the second base station.

6. A method for use in preventing interference as between a first base station and a second base station, wherein an ongoing communication cannot be handed over from the first base station to the second base station and wherein the first and second base station each employ, at least in part, a same set of carrier resources, the method comprising:
   at the second base station:
   receiving, from the first base station prior to any actual interference between the first base station and the second base station, a message comprising identification of at least one carrier resource that is not to be used by the second base station to prevent interference by usage of the second base station with a user of the at least one carrier resource of the first base station in the ongoing communication; and
   receiving, from the first base station, a release from not using the at least one identified carrier resource when at least a predetermined amount of time passes without the first base receiving interference from the second base station.

7. The method of claim 6 further comprising:
determining whether the message has instructional content that conflicts with a protected status that the second base station is administratively permitted to accord to some, but not all, of its carrier resources.

8. The method of claim 1 wherein the first base station is a wide-area base station and the second base station is a small-area base station.

* * * * *